Figure 1:
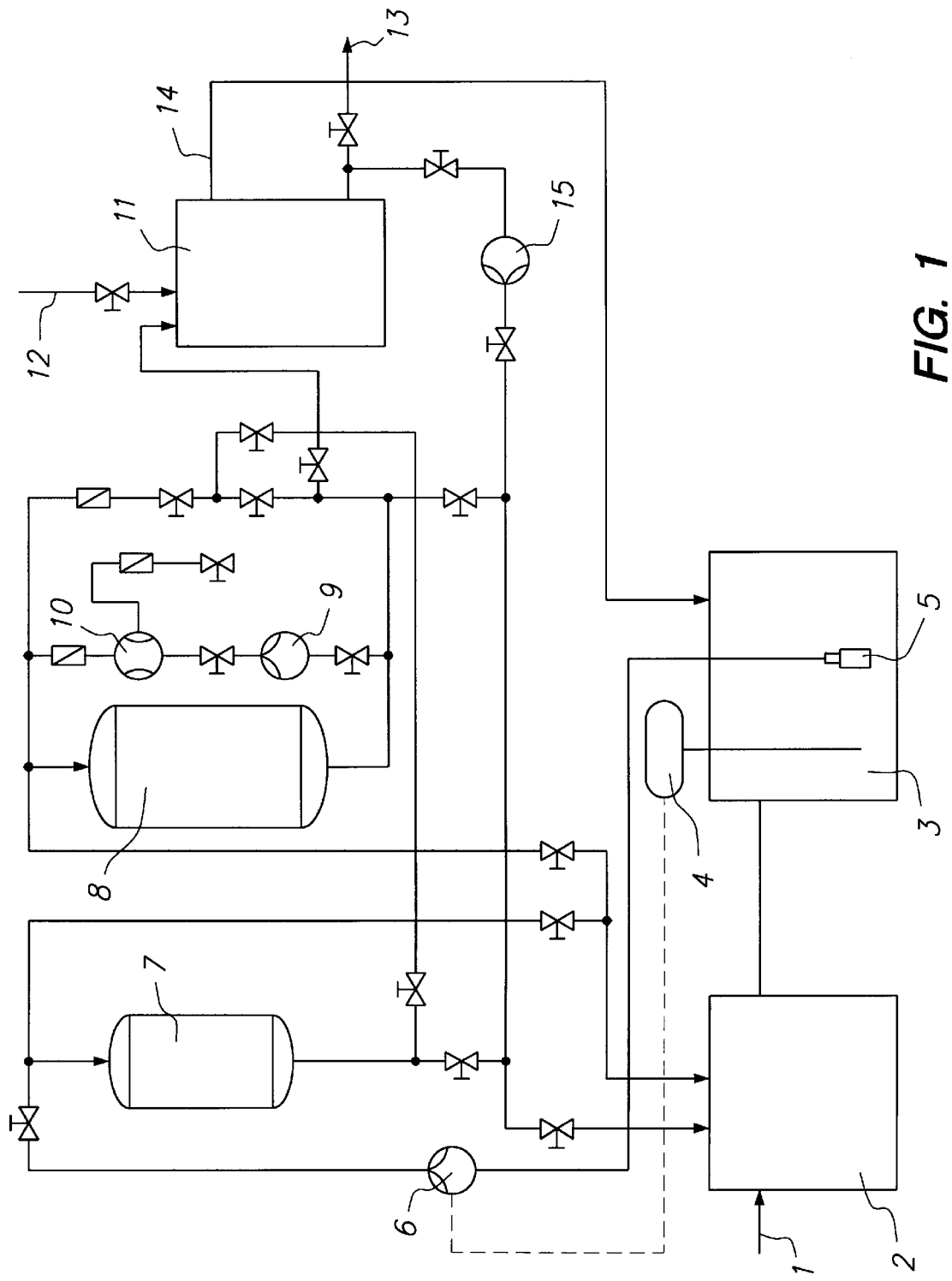

United States Patent
Schenk et al.

[11] Patent Number: 5,993,659
[45] Date of Patent: Nov. 30, 1999

[54] METHOD AND PLANT FOR WASTE WATER TREATMENT

[75] Inventors: Wolfgang Schenk, Lutherstadt-Wittenberg; Hans-Peter Riedele, Worringen, both of Germany

[73] Assignee: Hermann-Trentepohl Grosse Bockhorni & Partner, Herne, Germany

[21] Appl. No.: 08/795,502

[22] Filed: Feb. 5, 1997

[30] Foreign Application Priority Data

Feb. 6, 1996 [DE] Germany .......................... 196 04 164
Aug. 19, 1996 [DE] Germany .......................... 196 33 322

[51] Int. Cl.⁶ .................................................. C02F 3/06
[52] U.S. Cl. ........................ 210/618; 210/622; 210/631; 210/151; 210/167; 210/172
[58] Field of Search .................................. 210/150, 151, 210/167, 172, 195.1, 196, 202, 257.1, 258, 259, 617, 618, 621, 622, 631

[56] References Cited

U.S. PATENT DOCUMENTS 3,371,033  2/1968  Simmons et al. ....................... 210/150
3,539,507  11/1970 Woodbridge et al. .................. 210/622
3,713,543  1/1973  Heaney .................................... 210/622
4,812,237  3/1989  Cawley et al. .......................... 210/617
5,026,477  6/1991  Yen ......................................... 210/169
5,374,352  12/1994 Pattee ..................................... 210/167
5,407,564  4/1995  Thrailkill .............................. 210/195.1
5,573,671  11/1996 Klein ..................................... 210/618

FOREIGN PATENT DOCUMENTS 2651483  5/1977  Germany .
4116082  11/1992 Germany .

*Primary Examiner*—Christopher Upton
*Attorney, Agent, or Firm*—Bozicevic, Field & Francis LLP; Bret Field

[57] ABSTRACT

The invention relates to a method for treating waste water from carwashes in a mechanical and a biological treatment step, the waste water after running through a silt chamber (2) being collected in a reservoir (3), then passed via an aerosol filter (7) into a bioreactor (8) where it is collected for reuse after biological clarification in a clean-water tank (11), and to a plant for carrying out in particular this method.

25 Claims, 2 Drawing Sheets

METHOD AND PLANT FOR WASTE WATER TREATMENT

This invention relates to a method for treating waste water from carwashes in a mechanical and a biological treatment step, and to a plant which is especially suitable for carrying out this method.

It is known to treat the waste water from carwashes before passing it into the municipal sewerage by applying drainage systems according to DIN 1986 and DIN 1999 such that it meets the demands of the legislator and local governments. The waste water from carwashes is accordingly purified mechanically in a silt chamber, freed largely from mineral oil hydrocarbons in a light liquid separator, collected in a reservoir and passed into the sewer system via an inspection chamber. Further steps, such as chemical and/or biological treatment, can be included in the waste-water purification and serve to reduce the need for fresh water.

According to DE-A-26 51 483 one purifies the waste water from a carwash containing biodegradable cleaning and preservative agents as well as solids by mixing the waste water with a polymeric flocculent and passing it first through a sedimentation zone with reduced water flow and then via an adsorbent.

DE-C 41 16 082 describes a method for water treatment in carwashes wherein the arising waste water is purified mechanically or mechanically and biologically and recycled to the carwash. The solids arising during mechanical purification are collected into special-disposal garbage batches. The pollutants are treated mechanically or biologically in a multistage process in this method in such a way that solids with hydrocarbons and pollutants are separated from the carwash waste water by settling and collected in a first circuit, the hydrocarbons and pollutants with waste water containing washing substances are extracted from the washing zone during collection, and the mechanically clarified waste water is freed from nondegradable fractions by flotation and by biological reaction in a second circuit.

The common disadvantage of known methods is that the waste water must be treated in elaborate multistage processes. The arising solids, generally flotage and sand and silt washed off the vehicles, must be disposed of as garbage batches requiring special treatment. The water and solids collecting in the plant have a smell which can assume an extreme and annoying degree. Reuse of the purified waste water requires a high proportion of fresh water. The arising surplus water is to be led to municipal waste-water treatment via a sewage connection.

The invention is thus based on the problem of not only increasing the efficiency or waste-water treatment for complete reuse, but simultaneously decontaminating the sand and silt washed off the vehicles and treating it so that it can readily be fed to a suitable disposal site and no pollutant loads arise which require special disposal and treatment, such as mineral oil hydrocarbons and flotage. It must be possible to resume treatment easily after times of low washing activity.

This problem is solved by a method of the above mentioned type wherein the waste water after running through a silt chamber is collected in a reservoir, then passed into a bioreactor via an aerosol filter and collected for reuse after biological clarification in a clean-water tank.

The inventive method has a mechanically and a biologically working treatment step. The mechanical treatment step consists of the silt chamber in which sedimentation of the entrained coarse dirt occurs. This generally involves mineral particles which are frequently polluted by mineral oil products. Coarser mineral oil particles, for example from the waxing or undercoating of a motor vehicle, also pass into the silt chamber.

Biological treatment of the silt load also occurs in the silt chamber to a relevant extent. The backwash of the filtering installation and the bioreactor as described below causes oil-degrading microorganisms to pass repeatedly into the silt chamber, colonize there and do their work. A large part of the organic load of the silt chamber is thus decomposed by microorganisms. Experience has shown that the content of the silt chamber is decomposed after a few months into a humuslike mass which is no longer contaminated with mineral oil components and can readily be disposed of with household garbage.

After running through the silt chamber the waste water passes into a reservoir serving substantially as a buffer out of which water is continuously pumped into the bioreactor via filtering installation. The buffer effect of the reservoir has two aspects, firstly a quantitative aspect since a continuous waste-water stream must be released to the bioreactor regardless of the frequency of use of the carwash. Secondly the reservoir serves as a dilution basin for highly concentrated dirt loads arising in the cleaning of especially dirty motor vehicles or ones contaminated with special pollutants.

The aerosol filter is a conventional filter for removing suspended-matter load, consisting for example of several alternating layers of coarse and fine sand beds. The aerosol filter can be passed by waste water with or against gravity and must occasionally be backwashed with clean water for cleaning or else replaced. The filling of both the aerosol filter and the bioreactor is expediently carried on perforated plates or the like under which the outlet is located.

The bioreactor following the aerosol filter can likewise be passed by waste water with or against gravity and harbors microorganisms on a suitable supporting material which are suitable for degrading the dirt load in the waste water arising in a carwash. These are generally aerobically working bacteria which are known in the art and can be obtained with selection mechanisms likewise known.

The clean water emerging from the bioreactor is then collected in a clean-water tank and fed from there to the carwash for reuse.

Obviously one must react to the constant loss of recycle water due to evaporation and drag-out via washed motor vehicles by feeding in clean water. It has been shown in a pilot plant that several tens of thousands of cycles can readily be achieved with waste water thus treated and supplemented.

The bioreactor expediently consists of a fixed bed of porous supporting material which can absorb the organic ingredients of the waste water and offers the required microorganisms sufficient support for colonization. The microorganisms form on the surface of the supporting material and in the pores a lawn which filters the waste water flowing past and takes in the dirt/nutrients contained therein. The absorptive effect of the supporting material promotes this effect by feeding the components absorbed from the waste water to the microorganisms.

To ensure sufficient permeability of the fixed bed for the washing water, the porous supporting material expediently exists in the form of a bed which offers room between the individual support particles in addition the actual pore space. Suitable porous supporting materials are for example coal, clay, silica gel or zeolites in pelletized form or else plastic foam flakes with a sufficient pore volume, for example from polyurethane, polystyrene or the like. An especially suitable material has for example a particle size of 1 to 10 mm, a vibration density of 0.25 to 1.0 g/cm³, a pore volume of 0.40 to 1.0 cm³/g and a surface of more than 500 m²/g. However, other materials with comparable physical properties can likewise be used.

Obviously the bioreactor, like the aerosol filter, must be regularly backwashed to avoid being clogged with suspended particles or blocked by excessive bacterial growth. Both the aerosol filter and the bioreactor are backwashed in such a way that the washed-out materials are carried back into the silt chamber where the washed-in oil-degrading bacteria can do their work.

It is expedient to keep the bioreactor in service via a so-called afterrun even in times of low washing frequency. For this purpose one expediently passes clean water back into the reservoir and from there via the aerosol filter into the bioreactor. The circuit ensures regular flow through the bioreactor and thus also a regular nutrient supply from the reservoir. One simultaneously permits the dirt load contained in the reservoir to be degraded slowly overnight, which means that the new waste-water inflow on the next day is first diluted with relatively clean reservoir water, thereby avoiding a sudden dirt burden on the microorganisms.

As already mentioned, the bioreactor is expediently run aerobically. The quantity of oxygen contained in the washing water is generally insufficient for this. It is therefore expedient to introduce oxygen or air into the bioreactor, expediently via an air injector. One branches off part of the water running out of the bioreactor, saturates it with air and recycles it to the bioreactor. However, it is also readily possible to recycle water to the bioreactor from the clean-water tank after it has been saturated with air.

The clean-water tank collects the clean water running out of the bioreactor, making it available for reuse in the washing cycle. A sufficient volume ensures that enough water is available both for cleaning purposes and for the treatment method (backwash, afterrun). The clean water released to the carwash can first be sterilized via a degerming facility, for example with the help of UV radiation.

Obviously the preservative agents used in the washing process have no biostatic or biocidal components and are completely biodegradable. The rate of biodegradation is to be considered in the dimensioning of the treatment plant; the faster degradabiltiy is, the smaller the reservoir, bioreactor and clean-water tank can be designed, with certain limits. It has turned out that for an average carwash the silt chamber and reservoir and the clean-water tank should have a collecting volume of 6 m³ and the filter unit and bioreactor a capacity of 1 to 1.5 m³. Materials to be used for all pipes and tanks may be either corrosion-resistant metals or plastics that meet the requirements, in particular glass fiber-reinforced plastic or HDEP.

The waste waster arising in the carwash is thus expediently fed via a silt chamber known in the art to a reservoir and from there via an aerosol filter to an aerobically run fixed-bed reactor. The supporting material of the fixed-bed reactor is porous, has a large specific surface, can absorb water ingredients and serves to colonize special microorganisms. The water in the reactor is constantly circulated by a circulating pump and enriched with oxygen, preferably atmospheric oxygen from the ambient atmosphere, without pressure by a suitable device, preferably an injector. The circulation by a suitable rate can be varied with wide limits. It should be such that the biofilms are not damaged. The waste water passes from the bioreactor via an overflow control into the clean-water tank. From there it is recycled 100% to the washing process, optionally via a degerming facility.

It is advantageous to recycle water from the clean-water tank to the silt chamber without degermation for backwashing the plant or for maintaining a water cycle in phases of low washing intensity.

It becomes necessary to backwash the bioreactor and/or aerosol filter when the pressure difference between inlet and outlet of the aerosol filter or reactor vessel reaches a limiting value as a measure for the burden of retained suspended matter or surplus biology, for example 0.5 bars.

It is advantageous if the preservative agents used in the washing process are biodegradable with 24 hours and serve as food for the microorganisms.

It has further turned out that the inventive method is suitable for taking up and treating contaminated water from the workshop area and gasoline pump area of a gasoline station. It is therefore understood that not only the waste water arising in the carwash but also such further waste water can be treated and purified and can be used with the waste water. The inventive method is thus suitable for replacing the plants required for gasoline stations for treating atmospheric water.

The advantages to be achieved with the inventive method are in particular that the waste water returns to the washing process purified. The consumption of fresh water is thus reduced to compensating the losses due to evaporation and entrainment. In the inventive method only decontaminated silt chamber contents arise. No further residual substances requiring separate disposal or treatment arise. Surplus water can readily be released into the sewerage.

The invention relates further to a waste-water treatment plant which is suitable in particular for treating and recycling waste water from carwashes, workshops and/or gasoline stations and with which the above-described method can be carried out. Such a waste-water treatment plant has a mechanical and a biological purifying step, a silt chamber, reservoir, aerosol filter, bioreactor and clean-water tank being connected in series and interconnected by pipes, and the clean-water tank being connected with the reservoir by a return pipe to maintain a water cycle via the reservoir, aerosol filter and bioreactor into the clean-water tank upon an interruption in waste-water supply. Obviously the waste water treatment plant has the otherwise necessary inlets and outlets for waste water, clean water and optionally fresh water and the pumping devices necessary for operating the plant, as well as a control system.

The invention will be explained more closely by the following figures, in which

Figure 2:
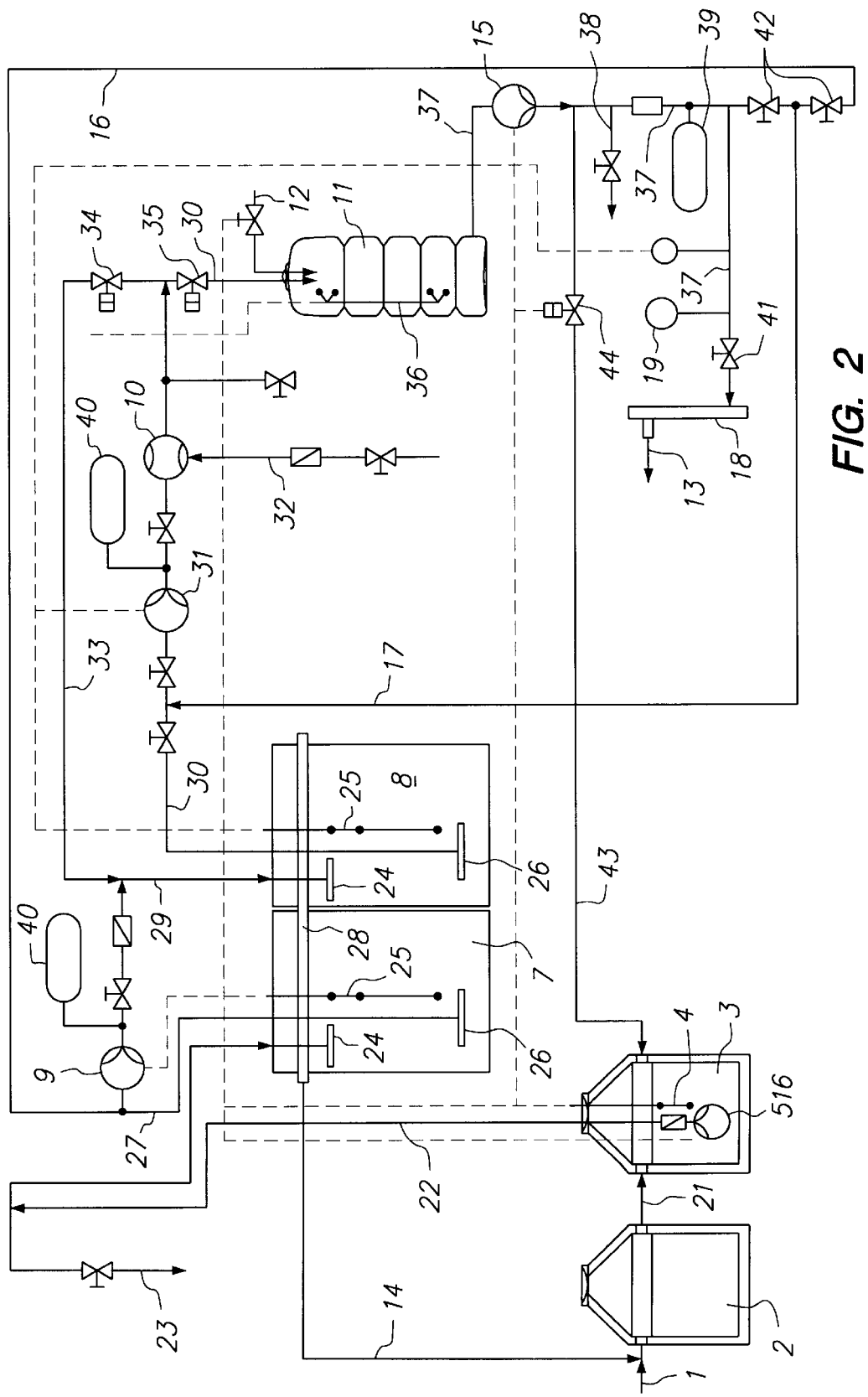

FIG. 1 shows schematically a first embodiment of an inventive waste-water treatment plant, and FIG. 2 shows a further variant of execution.

FIG. 1 shows the process diagram of the washing waste water treatment plant. The waste water arising in the carwash is collected in a waste-water channel below the carwash and passes via inflow 1 into silt chamber 2. Here the arising settling matter is retained, such as sand, silt and the like. The water freed from settling matter passes into reservoir 3. Controlled by a level control 4 the waste water is pumped by food pump 6 into aerosol filter 7, a sand filter. Here any suspended matter still present is removed. From aerosol filter 7 the prepurified waste water passes into fixed-bed reactor 8. The fluid phase of fixed-bed reactor 8 is constantly circulated by means of circulating pump 9 via injector 10. In injector 10 the fluid phase is enriched with oxygen preferably atmospheric oxygen from the ambient atmosphere.

Fixed-bed reactor 8 contains a porous supporting material with a high specific surface serving as a colonization surface for the microorganisms. Especially the biofilm forming in the supporting material depressions is protected from mechanical shear forces.

The supporting material is able to adsorb dissolved organic pollutants and thus provide food deposits for the microorganisms. The presence of such deposits in close proximity to the microorganisms clearly accelerated biodegradation.

From the fixed-bed reactor circuit the purified water passes into clean-water tank 11. From clean-water tank 11 the carwash is supplied via outflow 13, the water running through a UV degerming facility.

In times of low washing activity water is pumped from clean-water tank 13 via pump 15 back into silt chamber 2 and the circuit maintained by level control 4.

The pressure difference between inlet and outlet is measured in both aerosol filter 7 and fixed-bed reactor 8. When an empirically determined limiting value is reached the degree of enrichment with suspended matter or biomass in the particular unit is so great that the unit must be regenerated by backwash to the silt chamber. This is done by passing water from clean-water tank 11 by means of pump 15 backwards through fixed-bed reactor 8 or aerosol filter 7 into silt chamber 2. The two units are expediently backwashed independently of each other in the period of low washing activity.

It is expedient for operation of the plant if the preservative agents used in the carwash support the biodegradation process. For example, preservative agents with item numbers 18100 to 18500 from Wolfgang Schenk GmbH meet this requirement.

Obviously one first activates and conditions the wastewater treatment plant by inoculating the fixed-bed reactor with a starter culture and circulating the liquid phase before connecting the carwash.

In clean-water tank 11 only as much fresh water is supplemented via fresh-water connection 12 as is removed from the water cycle by entrainment or evaporation.

FIG. 2 shows a further variant of the inventive process control. The same numerals designate the same positions. The dotted lines designate control lines for operating the plant.

Waste water from the carwash, a workshop or the surface runoff water of a gasoline station area passes via feed pipe 1 into silt chamber 2 where coarse dirt is sedimented. Pipe 21 continues into reservoir 3 which serves as a buffer for waste water freed from coarse dirt. Reservoir 3 contains level control 4 with an upper and lower switching point.

Water from reservoir 3 is passed via suction body 5 and feed pump 6, which form one unit in the present embodiment, through pipe 22 into aerosol filter 7. Pipe 23 protected by a valve permits sampling of dirty water from pipe 22.

Water passes from reservoir 3 into aerosol filter 7 via manifold 24. The filter is filed with alternating layers of coarser and finer sand through which waste water runs from top to bottom. Via manifold 26 the filtered waste water is carried away using pump 9 through pipe 27. Level control 25 prevents the filter device from running dry but also has a lower switching point for emptying the filter device more or less completely. Overflow 28 recycles via pipe 14 into silt chamber 2 and is required when filter 7 is backwashed.

Water removed from the filter via manifold 26 passes via pipe 27 and pump 9 as well as pipe 29 into bioreactor 8. There it is distributed by manifold 24 over the surface the porous supporting material located therein, expediently active carbon pellets with large pore volume and sufficient empty space between the individual particles. The porous supporting material is colonized with microorganisms conditioned to the organic dirt load of the waste water. Waste water runs through the fixed bed of the bioreactor from top to bottom and is fed to clean-water tank 11 via manifold 26 of bioreactor 8 via pipe 30 using pump 31. Level control 25 ensures sufficient filling of bioreactor 8, as with aerosol filter 7.

An injector inserted in pipe 30 infects air taken in via pipe 32 into the water removed from bioreactor 8. The water saturated with air is fed via pipe 30 firstly to clean-water tank 11 but partially also recycled via pipe 33 to the bioreactor, where it ensures a sufficient oxygen supply for the reactor and the microorganisms. Solenoid valves 34 and 35 ensure the right distribution ratio of air-saturated water between bioreactor 8 and clean-water tank 11. Batchwise operation of bioreactor 8 is likewise possible, however, whereby a circuit through pipe 33 performs the air supply. Only completely clarified water is fed to tank 11.

Clean-water tank 11 receives the biologically clarified water from bioreactor 8. Level control 36 ensures that the clean-water tank is filled with a sufficient quantity of water to permit maintenance of both washing operation and night circuit operation. If the quantity of circulation water is too low, fresh water can be supplied via pipe 12.

Water is removed from clean-water tank 11 via pipe 37 using pump 15 and fed to return pipe 13 into the carwash. Degerming facility 18, preferably based on UV radiation to avoid addition of bactericidal degerming agents, optionally ensures the sterility of the washing water. Buffer vessel 19 filled with air ensures, in conjunction with pump 15, a uniform water flow into the following carwash. Pressure meter 39 is used for monitoring and controlling the pressure.

Outflow 38 leads into the sewerage and serves to remove surplus water in times of above-average water accumulation. This is expedient in particular when the treatment plant also treats surface water from a gasoline station area and is subject to large quantities of water from heavy precipitation.

Further pressure measuring points are located in pipes 27 for the bioreactor and 30 to the clean-water tank and bear reference signs 40. They are used for monitoring the working pressure of pumps 9 and 10.

In case one of these vessels is largely clogged with dirt particles or biomass, a backwash process is commenced from clean-water tank 11 via pipes 37, pump 15 and pipes 16 and 17 into aerosol filter 7 and bioreactor 8. Water enters the reactors via lower manifold 26 and washes the dirt particles or biomass via overflow 28 and pipe 14 into silt chamber 2. In this way microorganisms also pass into silt chamber 2, colonize therein and provide biological treatment of the sedimented dirt there.

In times of low washing activity, i.e. in particular at night, on weekends and holidays, a water cycle is preferably kept up in order to keep the aerosol filter and bioreactor in service. This circuit begins in clean-water tank 11 and runs via pipe 37, pump 15 and pipe 43 back into reservoir 3. Solenoid valve 44 is thereby opened via the central control device. Stop valves 41 and 42 to the carwash and into the backwash pipes are simultaneously blocked. The circuit then extends, as in normal treatment operation, from reservoir 3 via aerosol filter 7 and bioreactor 8 into the clean-water tank. After a certain time of circulation the quality of the water in circulation and in the connected tanks gradually approaches the quality of the water in clean-water tank 11.

We claim:

1. A method for treating waste water from a carwash, said method comprising:
   moving waste water sequentially from a carwash through the following:
   (a) a silt chamber;
   (b) a reservoir;
   (c) a filter capable of removing suspended-matter load;
   (d) a bioreactor; and
   (e) a clean water tank;
   whereby said waste water is treated.

2. The method according to claim 1, wherein said bioreactor comprises a fixed bed consisting of a porous supporting material adsorbent for the organic ingredients of said waste water and colonized with microorganisms known in the art for degrading said ingredients.

3. The method according to claim 2, wherein said porous supporting material is a bulk material.

4. The method according to claim 3, wherein said porous supporting material consists of coal, clay, silica gel, zeolites in pelletized from or plastic foam flakes.

5. The method according to claim 2, wherein said porous supporting material consists of coal, clay, silica gel, zeolites in pelletized form or plastic foam flakes.

6. The method according to claim 1, wherein said method further comprises discontinuously back-washing said filter capable of removing suspended-matter load with water from said clean water tank.

7. The method according to claim 6, wherein said method further comprises moving said backwash water into said silt chamber.

8. The method according to claim 1, wherein said method further comprises discontinuously back-washing said bioreactor with water from said clean water tank.

9. The method according to claim 8, wherein said method further comprises moving said backwash water into said silt chamber.

10. The method according to claim 9, wherein said method further comprises degerming said water from said clean water tank with UV light.

11. The method according to claim 1, wherein said method further comprises feeding water saturated with air into said bioreactor.

12. The method according to claim 1, wherein said method further comprises moving water from said clean water tank to said carwash.

13. A waste water treatment plant, said plant comprising:
    a silt chamber;
    a reservoir;
    a filter capable of removing suspended-matter load;
    a bioreactor; and
    a clean water tank;
    wherein said silt chamber, reservoir, filter, bioreactor and clean water tank are connected in series.

14. The plant according to claim 13, wherein said bioreactor comprises a fixed bed consisting of a porous supporting material adsorbent for the organic ingredients of said waste water and colonized with microorganisms known in the art for degrading said ingredients.

15. The plant according to claim 14, wherein said porous supporting material is a bulk material.

16. The plant according to claim 15, wherein said porous supporting material consists of coal, clay, silica gel, zeolites in pelletized form or plastic foam flakes.

17. The plant according to claim 14, wherein said porous supporting material consists of coal, clay, silica gel, zeolites in pelletized form or plastic foam flakes.

18. The plant according to claim 13, wherein said plant further comprises a backwash pipe from said clean water tank to said filter.

19. The plant according to claim 18, where said plant further comprises a return pipe from at least one of said filter and bioreactor to said silt chamber.

20. The plant according to claim 13, wherein said plant further comprises a backwash pipe from said clean water tank to said bioreactor.

21. The plant according to claim 20, where said plant further comprises a return pipe from at least one of said filter and bioreactor to said silt chamber.

22. The plant according to claim 13, wherein said plant further comprises a pipe from said clean water tank to said bioreactor, wherein said pipe comprises an air injector.

23. The plant according to claim 13, wherein said plant further comprises a run-dry protection means in at least one of said reservoir, filter, bioreactor and clean water tank.

24. The plant according to claim 13, wherein said plant further comprises a degerming means.

25. The plant according to claim 13, wherein said plant further comprises a pressure measuring means.

* * * * *